United States Patent [19]

Tada

[11] Patent Number: 4,921,017

[45] Date of Patent: May 1, 1990

[54] CHECK VALVE

[76] Inventor: Atsushi Tada, 2-6-3 Kakinokizaka, Meguro-Ku, Tokyo, Japan

[21] Appl. No.: 400,099

[22] Filed: Aug. 29, 1989

[30] Foreign Application Priority Data

Nov. 18, 1988 [JP] Japan .......................... 63-150574[U]

[51] Int. Cl.$^5$ ............................................. F16K 15/14
[52] U.S. Cl. ..................................... 137/843; 137/903
[58] Field of Search .................... 137/540, 843, 903

[56] References Cited

U.S. PATENT DOCUMENTS

| | | |
|---|---|---|
| 3,385,301 | 5/1968 | Harautuneian ................. 137/843 X |
| 4,445,535 | 5/1984 | Mayfield ......................... 137/903 X |
| 4,597,511 | 7/1986 | Licari .............................. 137/903 X |
| 4,681,132 | 7/1987 | Lardner .......................... 137/903 X |

FOREIGN PATENT DOCUMENTS 56-137763 10/1981 Japan .
57-31965 7/1982 Japan .

*Primary Examiner*—Robert G. Nilson
*Attorney, Agent, or Firm*—Frishauf, Holtz, Goodman & Woodward

[57] ABSTRACT

A check valve comprises a valve body and a plurality of blades—all made of plastics and integral with one another. The blades extend straight in the axial direction of the valve body. The blades undergo elastic deformation when pushed onto a tapered inner surface of a stopper at their free ends, thereby biasing the valve body onto a valve seat.

10 Claims, 3 Drawing Sheets

CHECK VALVE

BACKGROUND OF THE INVENTION

1. Field of the Invention

The present invention relates to a check valve for controlling the direction in which a fluid, either a liquid or a gas, flows, and in particular to a check valve which requires no valve springs usually used as an independent member.

2. Description of the Prior Art

A check valve comprises a valve seat and a valve body pushed onto the valve seat. Thus, the check valve allows the passage of only a fluid which forces the body away from the seat. Any fluid that flows in the opposite direction applies back pressure to the body, pressing the body onto the seat, and is therefore not allowed to pass through the check valve.

In the case of a check valve wherein the valve body is pressed onto the valve seat under its own weight, the body is readily moved away from the seat when it is applied with a pressure slightly greater than its weight is applied to it. The valve body is more easily moved away from the valve seat when the check valve is positioned slantwise, in which case the check valve fails to perform its function completely. Therefore, most check valves have a valve spring located at the back of the body and forcing the body onto the valve seat, thus holding the body in contact with the seat.

The operation pressure required to move the valve body from the valve seat can be set to any desired value, merely by using a valve spring having an appropriate spring constant. Hence, it is easy to design check valves having different operation pressures, by using valve springs of different constants.

Generally, compression coil springs made of metal are used as valve springs in check valves. The valve springs made of metal are likely to be corroded since they remain in contact with the fluid flowing through the check valves. Consequently, the kinds of fluids are limited, whose flow a check valve having a metal spring can control.

Accordingly, check valves have been invented, wherein the valve body and the valve spring are molded in a unit made of plastics, thus dispensing with a metal valve spring. As is disclosed in, for example, Japanese Utility Model Provisional Publication No. 137763/81, a conventional check valve has a valve spring which is a hollow cylinder made of plastics and integral with a valve body. When the valve spring is plastically deformed, and its cross section changes to an elliptical one, it pushes the valve body onto the valve seat. As is disclosed in, for example, Japanese Utility Model Publication No. 31965/82, another check valve has a plurality of corrugated leaf springs made of plastics. Since these check valves have no metal springs which are corroded with some fluids, they can be used to control the flow of various kinds of fluids. Further, since the check valve requires no springs independent of the valve bodies, they comprise less components and can be assembled more easily than otherwise.

However, to mold a body-spring unit having a hollow cylinder or a plurality of leaf springs, a relatively complex metal mold is required, which is no doubt expensive. Therefore, the check valve having the body-spring unit can hardly be manufactured at low cost.

BRIEF SUMMARY OF THE INVENTION

It is an object of the present invention to provide a check valve having a body-spring unit which can be molded by using a mold of a simple structure.

To accomplish this object, a check valve according to the invention comprises a valve body and a plurality of blade-shaped springs integrally formed with the body and extending in the axial direction of the check valve. The free end portion of each blade-shaped spring undergoes elastic deformation when pushed into a hollow cylindrical stopper whose inner surface is tapered, thereby pushing the valve body onto a valve seat.

The embodiments of the present invention will now be described, with reference to the accompanying drawings. Nonetheless, the present invention is not limited to these embodiments. Needless to say, various changes and modifications can be made, without departing the scope of the present invention.

DETAILED DESCRIPTION OF THE PREFERRED EMBODIMENTS

The embodiments of the present invention will be described in detail, with reference to the accompanying drawings.

Figure 1:
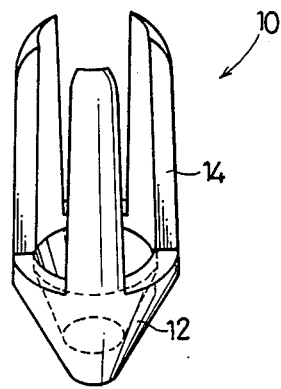
FIG. 1 is a perspective view showing a check valve according to the present invention.

As is illustrated in FIG. 1, a check valve 10 according to the present invention comprises a valve body 12 and a plurality of blades 14—all made iof plastics and integral with one another. The blades 14 function as valve springs. The valve body 12 is cone-shaped. It can have another shape, provided that it stops a fluid flowing when it is pushed onto a valve seat of a valve case (later described).

The check valve 10 needs no springs made of metal because the plastic blades 14 function as valve springs. Since the blades 14 are not corroded with various fluids, the check valve 10 can be used to control the flow of these fluids. Moreover, since the valve 10 has no valve springs independent of the valve body 12, it comprises a relatively small number of components and can be easily assembled.

As can be seen from FIG. 1, the blades 14 extend straight in the axial direction of the valve body 12. The check valve 10 consisting of only the body 12 and the blades 14 is comparatively simple in structure. Hence, the valve 10 can be formed by using a mold having a relatively simple structure and thus is inexpensive. Therefore, the check valve 10 can be manufactured at low cost.

Since the mold for manufacturing the check valve 10 has a relatively simple structure, the valve 10 can be made, by means of casting, of a metal resistant to corrosion and greatly elastic.

Figure 2:
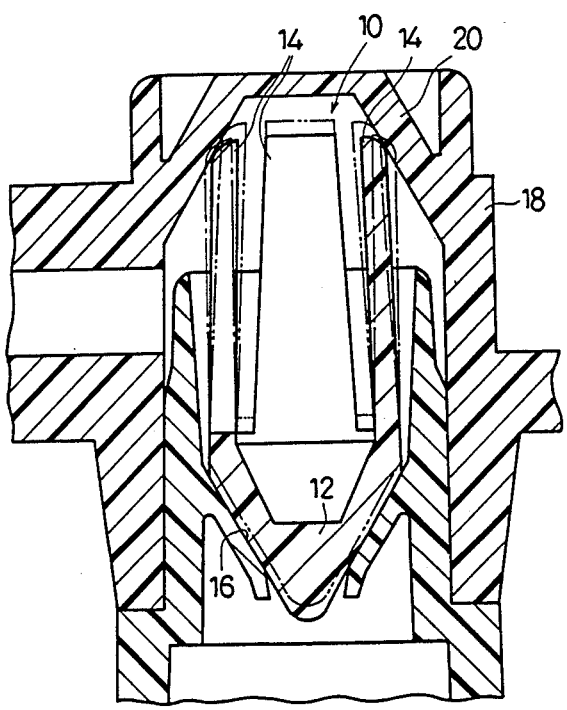
FIG. 2 is a longitudinal, sectional view illustrating the check valve and a valve case in which the valve is incorporated.

In use, the check valve 10 is used, so incorporated within a valve case 18 as is illustrated in FIG. 2. The case 18 comprises a hollow conical valve seat 16 and a hollow cylindrical stopper 20 having a tapered inner surface. The blades 14 of the valve 10 are forced against the stopper 20 and deformed elastically, with its shape, shown by the one-dot, one-dash lines, being changed to the shape indicated by the solid lines. Due to the elastic deformation of the blades 14 and the tapered inner surface of the stopper 20, a force is applied to the body 12, pushing the body 12 onto an inner surface of a valve seat 16. As is shown in FIGS. 1 and 2, the upper end portion of each blade 14 has a rounded outer surface. This helps to cause the blade 14 to bend smoothly.

As is clearly shown in FIG. 1, the check valve 10 has three blades 14 which are spaced apart at angular intervals of 120°. Hence, the forces generated by the three blades 14, elastically deformed, are applied to the valve body 12 at three points symmetrical with respect to the axis of the body 12. As a result, the body 12 fits well in the valve seat 16. The number of the blades 14 used is not limited to three, but is never one. For example, the valve 10 can have two blades 14 which are spaced apart at angular intervals of 180°.

It is sufficient for the stopper 20 to deform the blades 14 elastically and to cause them to push the body 12 into the hollow conical valve seat 16. To perform this function, the stopper 20 can be an inwardly flaring flange or can be a plurality of projections. However, it would be better for the stopper to be a hollow cone having a tapered inner surface, as is shown in FIG. 2. This is because, owing to the tapered inner surface, the blades 14 are deformed gradually, not suddenly, and are hardly broken.

Figure 3:
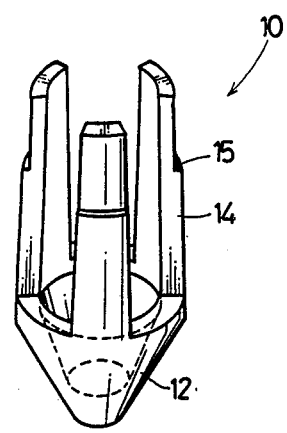
FIG. 3 is a perspective view showing another check valve according to the invention.

In the embodiment shown in FIGS. 1 and 2, the blades 14 are pushed, at their tips, onto the tapered inner surface of the stopper 20. However, as is shown in FIG. 3, each blade 14 can have a stepped portion 15 on the outer surface, and this stepped portion 15 can be held in contact with the tapered inner surface of the stopper 20.

Figure 4:
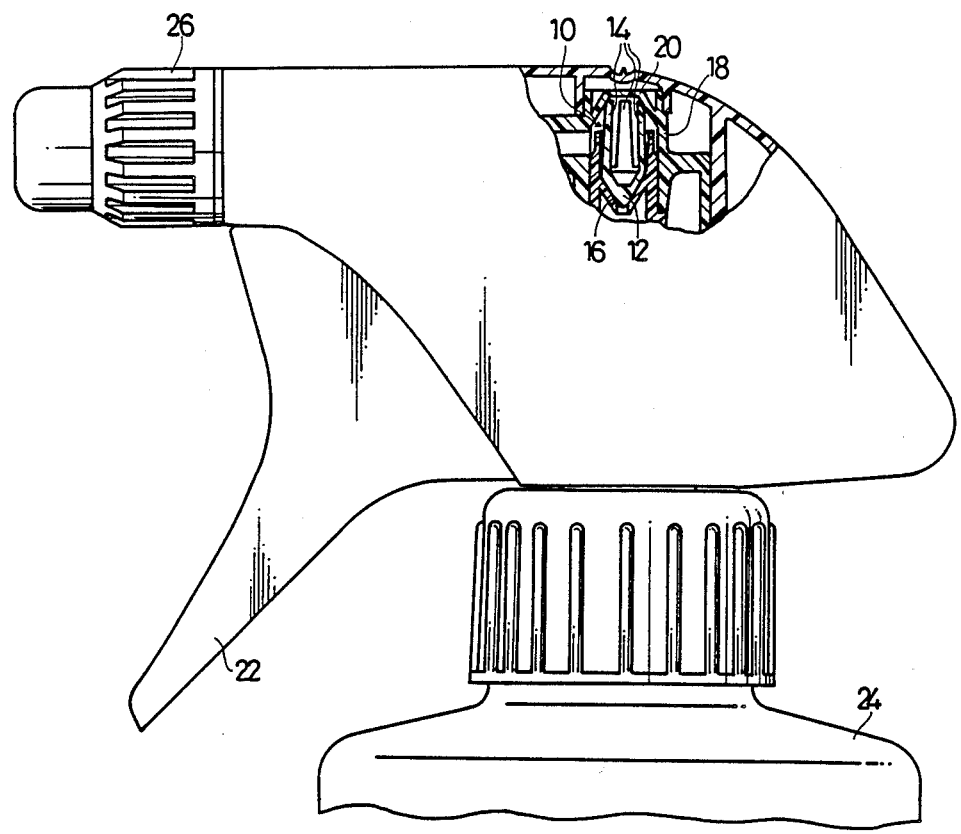
FIG. 4 is a partially sectional side view showing a trigger type dispenser which uses the check valve according to this invention as a secondary valve.

FIG. 4 is a partially sectional view of a trigger type dispenser, explaining how the check valve 10, used as secondary valve in the dispenser, performs its function. In the dispenser, a pump chamber (not shown) is defined between the secondary valve (i.e., the check valve 10) and the primary valve. When the trigger 22 of the dispenser is pulled, the liquid is sucked up into the pump chamber from a container 24 connected to the dispenser and pressurized within the pump chamber. The pressurized liquid forces the valve body 12 away from the valve seat 16, against the bias of the blades 14, thus deforming the blades 14 as is illustrated in FIG. 2 by the two-dot, one-dash lines. In other words, the liquid opens the check valve 10 and flows through the valve 10 into the spinner (not shown). The liquid thus swirls, and then is sprayed from the orifice (not shown) formed in the nozzle cap 28.

The check valve 10 can be used, not only as secondary valve of the trigger type dispenser but also as a primary valve. Also can it be used as a valve for changing the direction of a flow of fluid. It can be used in various apparatuses, as a safety valve, a flow-changing valve, and the like.

As has been described, the check valve according to this invention comrises a valve body and blade-shaped valve springs—all made of plastics and formed integral with one another into a single unit. Therefore, the valve requires no springs independent of the valve body, such as metal springs. Unlike metal springs, the blade-shaped springs made of plastics are resistant to corrosion with various kinds of fluids. Hence, the check valve can be used to control the flow of various fluids. Furthermore, since the valve needs no springs independent of the valve body, it is easy to assemble.

Still further, since the blade-shaped valve springs are straight, extending in the axial direction of the valve body, the check valve can be formed by using a metal mold having a relatively simple structure, though the valve springs are integral with the valve body. The metal mold, simple in structure, is comparatively inexpensive. This helps to manufacture the valve easily at low cost.

Preferably, the upper end portion of each blade-shaped spring has a rounded outer surface. This helps to cause the blade 14 to bend smoothly.

It is desirable that the check valve has three blade-shaped springs spaced apart at angular intervals of 120°. If this is the case, the forces, which the springs generate when they are elastically deformed, are applied to the valve body at three points which are symmetrical with respect to the axis of the body. As a result, the valve body fits well in the valve seat.

What is claimed is:

1. A check valve, comprising:
   a valve body made of plastics; and
   a plurality of blades made of plastics, said blades being formed integral with said valve body and extending in the axial direction of said valve body, said blades having free ends, and said blades undergoing elastic deformation when pushed onto a tapered inner surface of a stopper at their free ends, thereby biasing said valve body onto a valve seat.

2. The check valve according to claim 1, wherein the free end of each blade is rounded.

3. The check valve according to claim 1, wherein said plurality of blades comprises three blades which are spaced apart at regular, angular intervals.

4. The check valve according to claim 1, wherein each of said blades has a stepped portion on its outer surface.

5. The check valve according to claim 1, wherein said blades extend substantially straight in said axial direction of said valve body.

6. The check valve according to claim 1, wherein said blades comprise elastic spring-like members.

7. A check valve, comprising:
   a valve body made of plastics; and
   a plurality of blades made of plastics, said blades being formed integral with said valve body and extending in the axial direction of said valve body, said blades having free ends and said blades each having a stepped portion on its outer surface, and said blades undergoing elastic deformation when pushed onto a tapered inner surface of a stopper at their respective stepped portions, thereby biasing said valve body onto a valve seat.

8. The check valve according to claim 7, wherein said plurality of blades comprises three blades which are spaced apart at regular, angular intervals.

9. The check valve according to claim 7, wherein said blades extend substantially straight in said axial direction of said valve body.

10. The check valve according to claim 7, wherein said blades comprise elastic spring-like members.

* * * * *

Disclaimer 4,921,017.—*Atsushi Tada*, Tokyo, Japan. CHECK VALVE. Patent dated May 1, 1990. Disclaimer filed Dec. 20, 1990, by the inventor.

Hereby enters this disclaimer to claim 1 of said patent.
[ *Official Gazette April 30, 1991* ]